United States Patent

Daniels

[11] Patent Number: 5,695,011
[45] Date of Patent: Dec. 9, 1997

[54] GARDENING HAND TOOL

[76] Inventor: Francis P. Daniels, Rte. 1 Box 205, New Milton, W. Va. 26411

[21] Appl. No.: 731,503

[22] Filed: Oct. 17, 1996

[51] Int. Cl.$^6$ .................................................. A01B 1/00
[52] U.S. Cl. .......................... 172/381; 172/753; 172/770; 30/344; 30/340; 294/55; 294/57
[58] Field of Search ............................. 172/371, 377, 172/381, 753, 770; 30/523, 254, 344, 342, 340; 294/55, 57, 58

[56] References Cited

U.S. PATENT DOCUMENTS

| | | | |
|---|---|---|---|
| 272,266 | 2/1883 | Kirkpatrick et al. | |
| 440,059 | 11/1890 | Quigley . | |
| 600,592 | 3/1898 | Moses . | |
| 969,528 | 9/1910 | Disbrow . | |
| 1,271,287 | 7/1918 | Daly . | |
| 1,551,815 | 9/1925 | Ferguson | 30/344 X |
| 2,331,414 | 10/1943 | Morres | 172/377 X |
| 2,343,176 | 2/1944 | Fierbaugh | 172/371 |
| 2,601,450 | 6/1952 | O'Neill | 30/340 X |
| 2,621,614 | 12/1952 | Walling | 294/55 X |
| 2,809,809 | 10/1957 | Johnston . | |
| 3,608,644 | 9/1971 | Ambrose . | |
| 3,914,884 | 10/1975 | Guinot | 294/55 X |
| 4,249,312 | 2/1981 | Christy et al. | 30/340 X |
| 4,959,905 | 10/1990 | Ghislain | 30/340 X |
| 5,014,792 | 5/1991 | Gierloff | 172/371 |
| 5,040,614 | 8/1991 | Nash | 172/371 X |
| 5,350,021 | 9/1994 | Walker | 172/371 X |
| 5,442,832 | 8/1995 | Tonsager . | |

FOREIGN PATENT DOCUMENTS

| | | | |
|---|---|---|---|
| 2079391 | 3/1993 | Canada | 294/55 |
| 30824 | 9/1960 | Finland | 172/371 |
| 15092 | of 1885 | United Kingdom | 30/344 |

*Primary Examiner*—Terry Lee Melius
*Assistant Examiner*—Christopher J. Novosad
*Attorney, Agent, or Firm*—Richard C. Litman

[57] ABSTRACT

A multipurpose work-saving and ergonomically designed gardening tool useful for transplanting seedlings and other gardening tasks. A creased metal blade has a faceted cutting edge with straight sides. A cylindrical handle supports the flat end of the blade with fasteners.

11 Claims, 3 Drawing Sheets

GARDENING HAND TOOL

BACKGROUND OF THE INVENTION

1. Field of the Invention

The present invention relates to a hand tool which provides a multipurpose device for the garden.

2. Description of the Prior Art

Digging tools and hand implements with non-flat blade surfaces are known in the prior art, but have various handles other than the single cylindrical handle of the present invention. The prior art will be reviewed in the order of perceived relevance to the present invention.

U.S. Pat. No. 272,266 issued on Feb. 13, 1883, to Elijah Kirkpatrick et al. describes a ditching-spade having two integrated blades formed at a right angle and a long handle with a D-shaped hand hold. There is no suggestion to use this spade for purposes other than digging small ditches.

U.S. Pat. No. 600,592 issued on Mar. 15, 1898, to Joseph Moses describes a combination scoop-funnel-skimmer consisting of a two-sided trough or funnel with a flat rear wall on which a ring handle is positioned. The rear wall has an extended overhang for hanging when the scoop is not being used. There is no suggestion for altering the ring handle and overhang.

U.S. Pat. No. 969,528 issued on Sep. 6, 1910, to Reuben B. Disbrow describes a hardwood butter blade having a flat rectangular blade which decreases in thickness down to the front end. A handhole, a gripping bar and a finger passage permit the operation of the planar butter blade with a part of the lower arm pressed against the engaging bail. There is no suggestion for altering the configuration of the butter blade.

U.S. Pat. No. 2,809,809 issued on Oct. 15, 1957, to Charles R. Johnston describes a metal lawn edger fabricated with three separate parts comprising two rectangular strips joined by a T-shaped ground stake having a bent stem coming to a point. The stem can have barbs. The joined strips have soft curved top edge forming a closed lip. There is no suggestion for utilizing the edger as a garden tool.

U.S. Pat. No. 3,914,884 issued on Oct. 28, 1975, to Gabriel L. Guinot describes a double bladed axially articulated excavator scoop for heavy duty equipment. Two separate blades are rotated to perform the functions of penetration, pulsating, and dumping the soil. A second embodiment immobilizes the two blades. There is no suggestion for utilizing the second embodiment as a garden tool.

U.S. Pat. No. 1,271,287 issued on Jul. 2, 1918, to Edmund Daly describes a trench digging tool for heavy duty equipment. The long narrow blade has a straight chisel edge in the front end and a curved rear end attached to and pivoting from the handle of the heavy duty equipment. There is no suggestion for utilizing this trench digging tool as a garden tool.

U.S. Pat. No. 440,059 issued on Nov. 4 1890 to William C. Quigley describes a scoop or cup for removing materials such as flour and sugar from barrels or boxes. The metal food scoop or cup has two wooden handles formed into a T-shape. There is no suggestion for utilizing the food scoop or cup for a garden tool.

None of the above inventions and patents, taken either singly or in combination, is seen to describe the instant invention as claimed.

SUMMARY OF THE INVENTION

Accordingly, it is a principal object of the invention to provide a multipurpose gardening hand tool which is ergonomic in minimizing the strain of one's wrist.

It is another object of the invention to provide a gardening hand tool primarily for transplanting seedlings in the garden and digging out the soil for placement of potted plants.

It is a further object of the invention to provide a versatile gardening hand tool for removing weeds, excavating, aerating, firming loose soil, and piling soil around plants.

It is yet a further final object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention provides a multipurpose gardening hand tool which is ergonomically designed to perform functions such as transplanting seedlings, planting potted nursery stock, aerating the soil, piling the soil around plants, excavating, and firming the loose soil.

Figure 1:
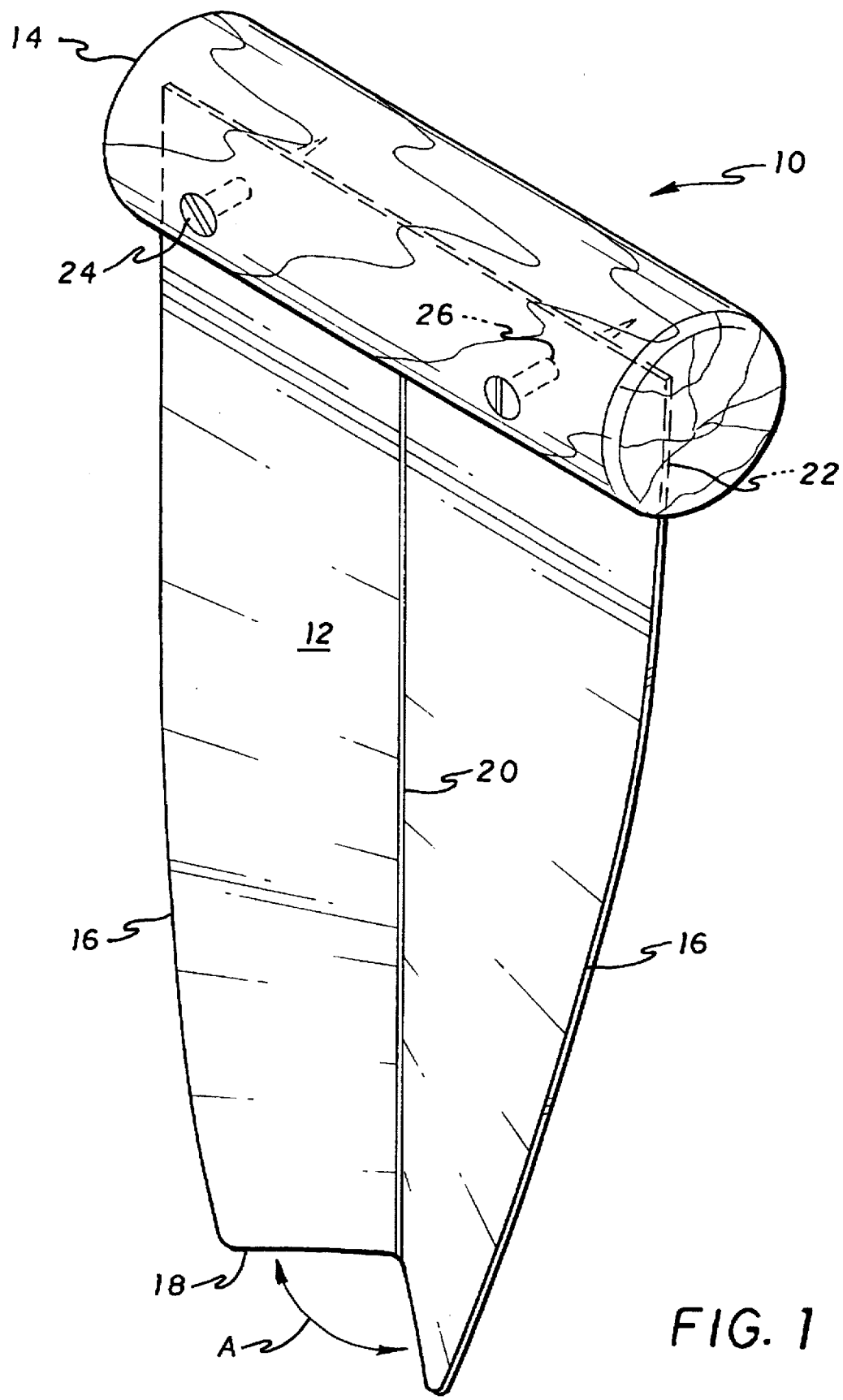
FIG. 1 is a perspective view of the gardening hand tool.
Figure 2:
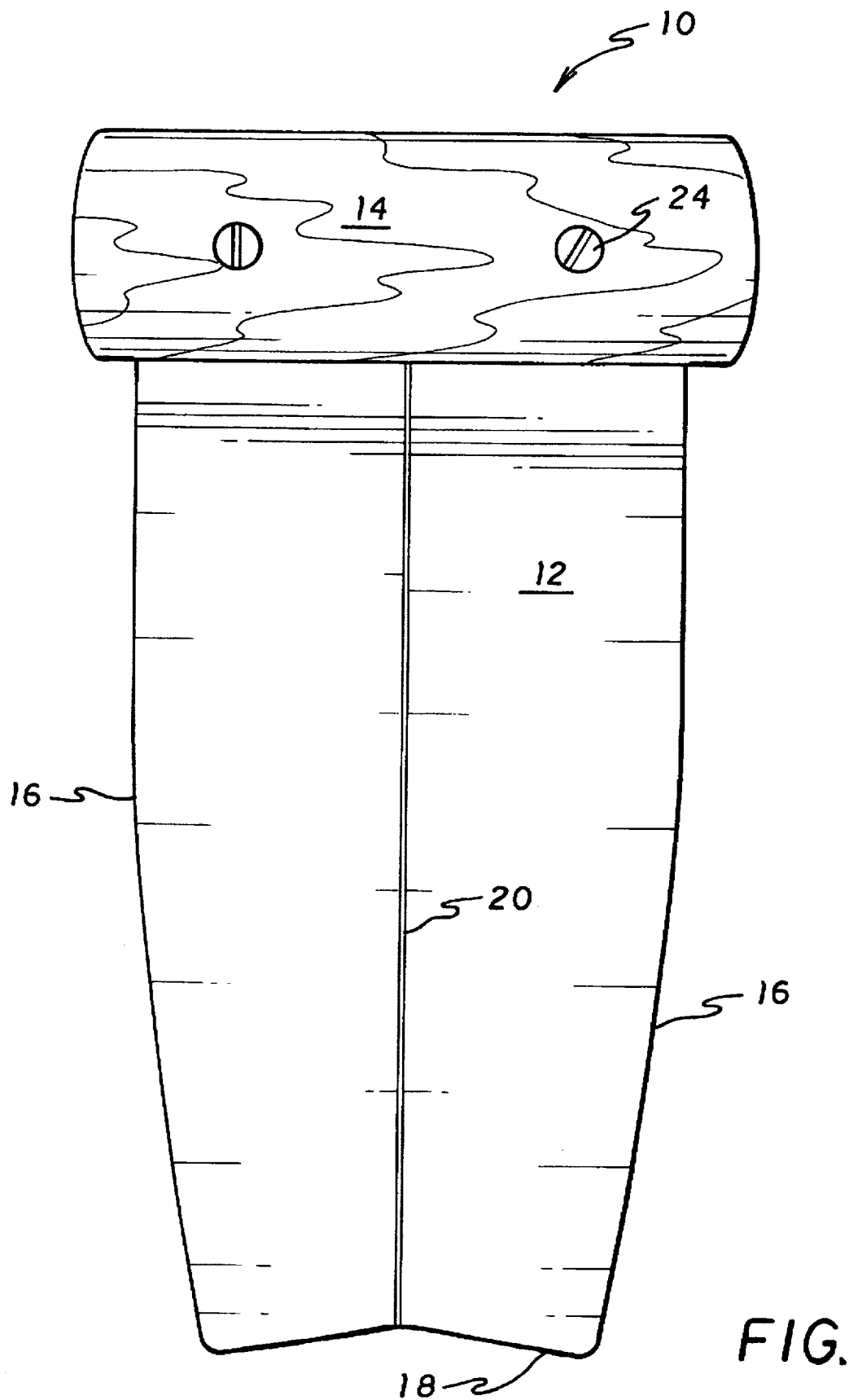
FIG. 2 is a front view of the gardening hand tool.
Figure 3:
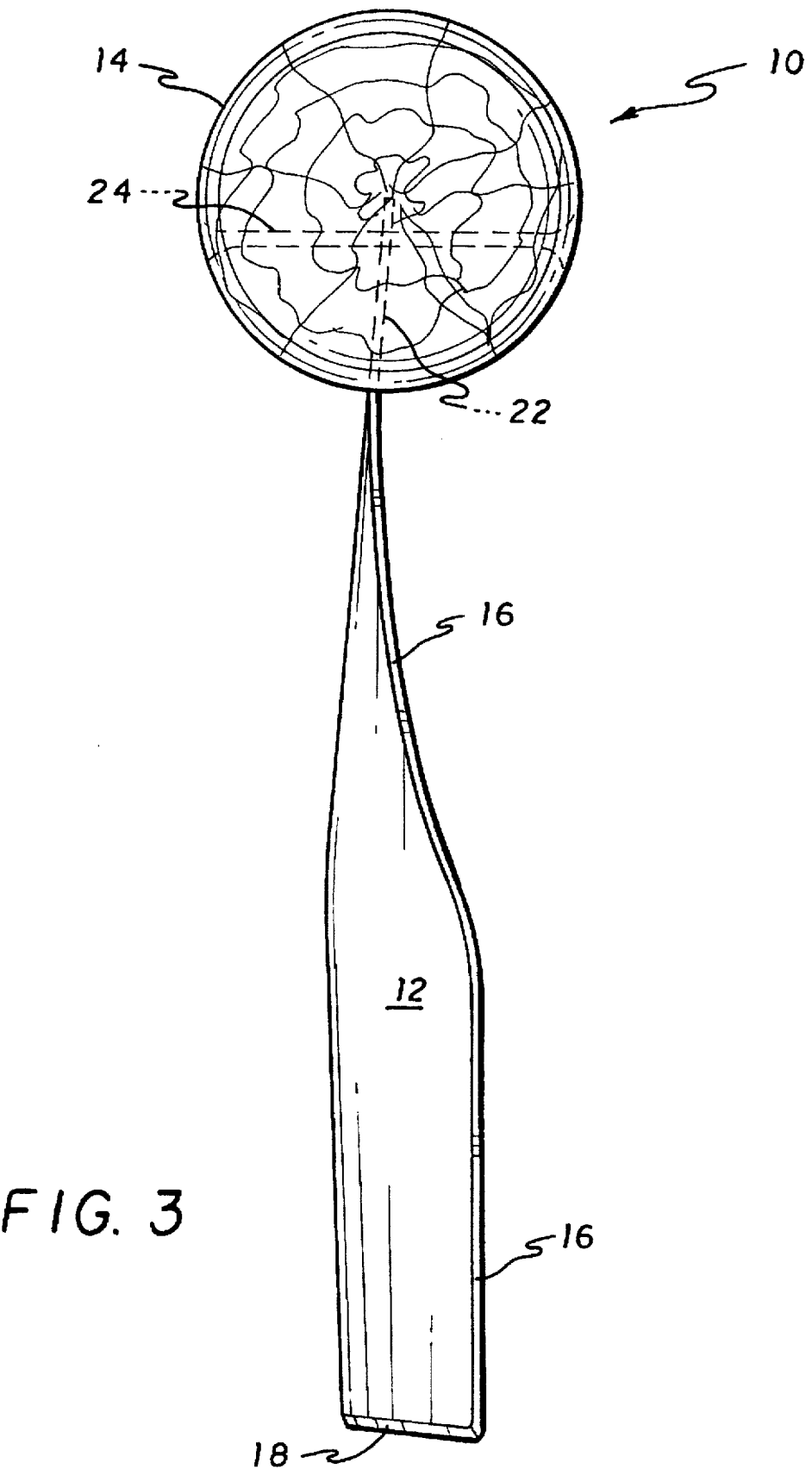
FIG. 3 is side view of the gardening hand tool.

FIGS. 1–3 are views of the multipurpose gardening hand tool 10 consisting of a metal blade 12 held by a cylindrical wooden or plastic handle 14. The blade 12 is formed with two side edges 16 and a sharp and slightly bent cutting edge 18 having a centered crease 20 which ends at the handle 14. The width of the side edges 16 narrows slightly from the handle 14 to the cutting edge 18. The preferred inside angle of the creased blade 12 is approximately 120°. It has been found unexpectedly that the crease provides strength and rigidity to the full length of the blade. Another advantage is the slight curvature in cutting around a plant to be transplanted or to dig a hole for planting potted nursery stock.

A radial longitudinal slot 22 of a length equal to the length of the rear end of blade 12 is cut in handle 14. The depth of the slot extends radially into the handle and the magnitude of the depth of the slot approaches the length of the radius of the handle. The length of the slot extends longitudinally along the side of the cylindrical handle.

The rear end of the blade 12 entirely inserted in the slot 22 of the handle 14 is flat and secured by at least two fasteners 24 evenly spaced along from the ends of the handle and aligned with the holes 26 in the blade 12. Although metal screws (FIGS. 1 and 2) and malleable metal rivets (FIG. 3) are illustrated, metal pins or nuts and bolts can be utilized.

The primary use of this multipurpose garden tool 10 is for transplanting seedlings or plants. The tool 10 enables an ergonomic advantage in forcing the tool down into the soil around a plant by allowing the gardener to use the palm of the gripping hand and pushing down with the entire arm and upper body. Both hands can also be utilized to perform the downward thrusting movement into the soil. A conventional garden trowel requires the use of the wrist at an awkward angle causing discomfort and needless stress. Other uses of the present invention include aeration of compacted soil, piling the soil around plants, excavating soil for planting, firming any loose soil, cutting weeds, and furrowing the soil for seeding.

Exemplary dimensions and compositions of the parts of the multipurpose gardening hand tool are as follows:

- Blade 12: 20 gauge stainless steel, 7 inches long, 4 inches wide at the handle, 2.5 inches wide at the cutting edge, and the included angle A at the cutting edge ranges from 110°–130°.
- Handle 14: hardwood (or plastic) dowel, 5 inches long, 2 inches in diameter, having a centered slot or kerf ⅞ inch deep and 4 inches long.
- Fasteners 24: Screws, pins, rivets, and bolts and nuts.

It is to be understood that the present invention is not limited to the sole embodiment described above, but encompasses any and all embodiments within the scope of the following claims.

I claim:

1. A multipurpose ergonomic and work-saving gardening hand tool comprising:
   a blade having a front end including a cutting edge and an opposite flat rear end, the front end of said blade bent about a longitudinal crease thereby forming an angle in the cutting edge; and
   a cylindrical handle having a length and defining a radial longitudinal slot, the flat rear end of said blade fastened within the slot; whereby
   a gardener can utilize the gardening hand tool with palm pressure and minimum strain on the gardener's wrist.

2. The gardening hand tool according to claim 1, wherein the front end of the blade is bent to form an angle at about a center of the cutting edge.

3. The gardening hand tool according to claim 1, wherein the the front end of said blade is bent to form an included angle of approximately 120° in the cutting edge.

4. The gardening hand tool according to claim 1, wherein the cutting edge is sharp.

5. The gardening hand tool according to claim 1, wherein the rear end of said blade is fastened within the slot of said handle by fasteners passing through the rear end of said blade and said handle.

6. The gardening hand tool according to claim 5, wherein the handle has a first end and an opposite second end; and
   said fasteners include a first fastener and a second fastener, said first fastener spaced a distance from said first end substantially equal to a distance between said second fastener and said second end.

7. The gardening hand tool according to claim 1, wherein the handle is hardwood.

8. The gardening hand tool according to claim 1, wherein the blade is stainless steel of at least 20 gauge thickness.

9. The gardening hand tool according to claim 1, wherein the rear end of said blade has an edge having a length substantially equal to the length of the handle.

10. The gardening hand tool according to claim 1, wherein the rear end of said blade is retained entirely within the slot of said handle.

11. The gardening hand tool according to claim 1, wherein said handle has a radius and the slot has a depth substantially equal to the radius.

* * * * *